(12) United States Patent
Nakada et al.

(10) Patent No.: US 9,743,471 B2
(45) Date of Patent: Aug. 22, 2017

(54) LIGHTING DEVICE AND LIGHTING FIXTURE FOR CURRENT CONTROL WITH A SOLID-STATE LIGHTING ELEMENT

(71) Applicant: Panasonic Intellectual Property Management Co., Ltd., Osaka (JP)

(72) Inventors: Katsuyoshi Nakada, Gumma (JP); Keisuke Ueda, Niigata (JP); Kenichi Fukuda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/178,850

(22) Filed: Jun. 10, 2016

(65) Prior Publication Data

US 2016/0374162 A1 Dec. 22, 2016

(30) Foreign Application Priority Data

Jun. 19, 2015 (JP) ................................. 2015-124183

(51) Int. Cl.
*H05B 33/08* (2006.01)
*H05B 37/02* (2006.01)
*H02M 3/156* (2006.01)

(52) U.S. Cl.
CPC ........ *H05B 33/0815* (2013.01); *H02M 3/156* (2013.01); *H05B 33/0845* (2013.01); *H05B 37/0281* (2013.01)

(58) Field of Classification Search
CPC ............ H05B 33/0815; H05B 33/0845; H05B 37/0281; H02M 1/36; H02M 7/06
USPC ..................................................... 315/209 R
See application file for complete search history.

(56) References Cited

U.S. PATENT DOCUMENTS

| | | | |
|---|---|---|---|
| 2010/0109571 A1 | 5/2010 | Nishino et al. | |
| 2011/0204823 A1* | 8/2011 | Mizukawa | H05B 33/089 315/308 |
| 2011/0210675 A1 | 9/2011 | Hamamoto et al. | |
| 2012/0019714 A1* | 1/2012 | Hiramatu | H05B 33/0815 348/370 |
| 2012/0194090 A1* | 8/2012 | Esaki | H02M 3/156 315/200 R |
| 2012/0242246 A1* | 9/2012 | Naruo | H05B 33/0818 315/283 |

(Continued)

FOREIGN PATENT DOCUMENTS

| | | | | |
|---|---|---|---|---|
| EP | 2247168 A1 * | 11/2010 | ......... | H05B 41/2881 |
| JP | 2008-187821 A | 8/2008 | | |

(Continued)

*Primary Examiner* — Dylan White
(74) *Attorney, Agent, or Firm* — Renner, Otto, Boisselle & Sklar, LLP (57) ABSTRACT

A lighting device which outputs a DC current to a load, the lighting device including: a downconverter circuit which includes a switching element and steps down a DC voltage input to the downconverter circuit; and a controller which controls turning on and off of the switching element, wherein the controller has operating modes including a detection mode in which the controller detects a time taken for a current through the switching element to reach a predetermined value after the switching element turns on, the current through the switching element representing the DC current output to the load.

7 Claims, 6 Drawing Sheets

(56) References Cited

U.S. PATENT DOCUMENTS

| | | | |
|---|---|---|---|
| 2012/0262080 A1* | 10/2012 | Watanabe | H05B 33/0818 |
| | | | 315/210 |
| 2013/0099694 A1* | 4/2013 | Naruo | H05B 33/0824 |
| | | | 315/224 |
| 2014/0092642 A1* | 4/2014 | Yoshinaga | H05B 33/0818 |
| | | | 363/21.12 |
| 2015/0035446 A1* | 2/2015 | Yamahara | H05B 33/0818 |
| | | | 315/210 |
| 2015/0042228 A1 | 2/2015 | Hiramatu et al. | |
| 2015/0084510 A1 | 3/2015 | Miura et al. | |
| 2015/0123556 A1* | 5/2015 | Onishi | H05B 33/0815 |
| | | | 315/224 |

FOREIGN PATENT DOCUMENTS

| | | |
|---|---|---|
| JP | 2011-023440 A | 2/2011 |
| JP | 2011-181295 A | 9/2011 |
| JP | 2012-023277 A | 2/2012 |
| JP | 2012-064525 A | 3/2012 |
| JP | 2013-218917 A | 10/2013 |
| JP | 2015-035262 A | 2/2015 |
| JP | 2015-035263 A | 2/2015 |
| JP | 2015-065040 A | 4/2015 |

* cited by examiner

| Ton [μ sec] | PEAK CURRENT (SETTING VALUE) [mA] |
|---|---|
| 1.0 | 500 |
| 1.1 | 550 |
| 1.2 | 600 |
| . | . |
| . | . |
| . | . |

United States Patent US 9,743,471 B2

LIGHTING DEVICE AND LIGHTING FIXTURE FOR CURRENT CONTROL WITH A SOLID-STATE LIGHTING ELEMENT

CROSS REFERENCE TO RELATED APPLICATION

This application claims the benefit of priority of Japanese Patent Application Number 2015-124183, filed Jun. 19, 2015, the entire content of which is hereby incorporated by reference.

BACKGROUND

1. Technical Field

The present disclosure relates to a lighting device and a lighting fixture, and, more particularly, to a lighting device which outputs current to a solid-state light emitting element, and a lighting fixture which includes the lighting device.

2. Description of the Related Art

Various lighting devices, which supply current to a solid-state light emitting element such as a light emitting diode (LED), are proposed.

A lighting device outputs constant current to a solid-state light emitting element which is a load. The output current of the lighting device varies according to a load voltage (forward voltage) applied to the solid-state light emitting element. Accordingly, for example, a time it takes a smoothing condenser at an output end of the lighting device to be charged, that is, a time it takes the solid-state light emitting element to turn on varies. Due to this, if the solid-state light emitting element which is the load of the lighting device is changed to another solid-state light emitting element, the load voltage changes. Accordingly, the time it takes the solid-state light emitting element to turn on changes.

A lighting device that changes output current according to such changes in load voltage is proposed (e.g., Japanese Unexamined Patent Application Publication No. 2011-181295 (PTL 1)).

SUMMARY

PTL 1 discloses a lighting circuit which uses a characteristics setting signal output from a solid-state light emitting element module in order to enable use of different solid-state light emitting element modules having different load voltages available. Accordingly, the lighting circuit disclosed in PTL 1 outputs current that is adapted to electric characteristics for each solid-state light emitting element module, based on the characteristics setting signal.

The lighting device disclosed in PTL 1, however, requires a solid-state light emitting element module that has a signal output terminal for outputting the characteristics setting signal, in addition to a current input terminal, in other words, the lighting device disclosed in PTL 1 is unable to use a solid-state light emitting element module that does not have the signal output terminal.

The present disclosure is made to solve the problem, and provides a lighting device and a lighting fixture which can sense a load voltage.

To solve the above problem, one aspect of the lighting device according to the present disclosure is a lighting device which outputs a DC current to a load, the lighting device including: a downconverter circuit which includes a switching element and steps down a DC voltage input to the downconverter circuit; and a controller which controls turning on and off of the switching element, wherein the controller has operating modes including a detection mode in which the controller detects a time taken for a current through the switching element to reach a predetermined value after the switching element turns on, the current through the switching element representing the DC current output to the load.

According to the present disclosure, the lighting device and the lighting fixture which can sense the load voltage are provided.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF EMBODIMENTS

Hereinafter, embodiments according to the present disclosure are described, with reference to the accompanying drawings. The embodiments described below are each merely illustration of the present disclosure. Thus, values, shapes, materials, components, and arrangement and connection between the components, steps, and the order of the steps shown in the following embodiments are merely illustrative and not intended to limit the present disclosure. Therefore, among the components in the embodiments below, components not recited in any one of the independent claims indicating the top level concept of the present disclosure are described as arbitrary components.

The figures are schematic views and do not necessarily illustrate the present disclosure precisely. In the figures, the same reference signs are used to refer to substantially the same configuration, and thus duplicate description is omitted or simplified.

Embodiment

[1. Overall Configuration]

Figure 1:
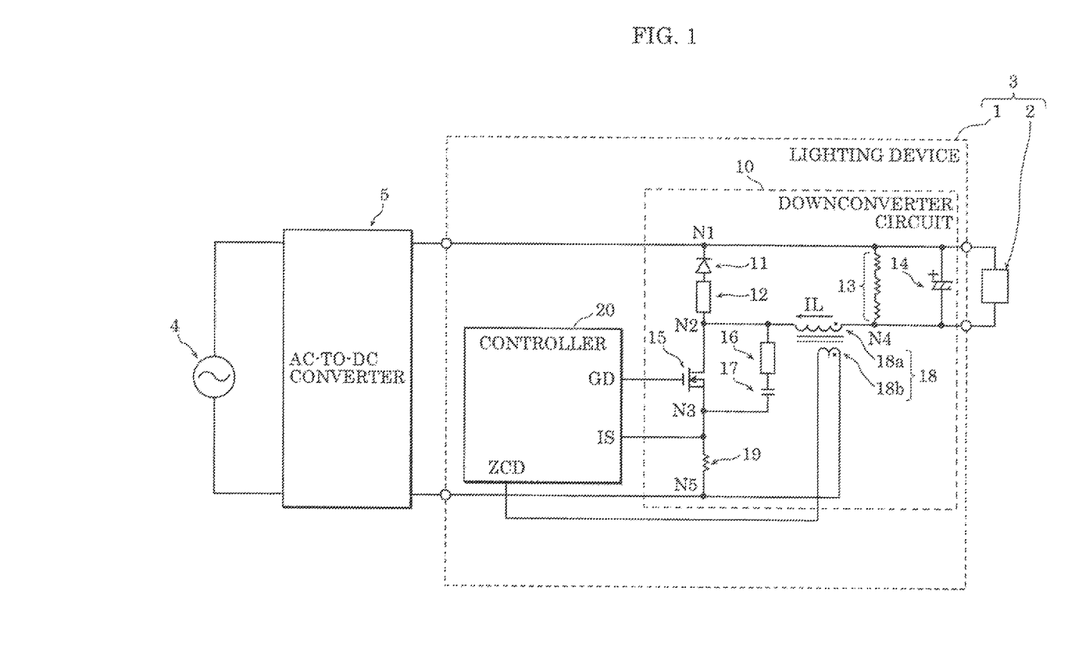
FIG. 1 is a circuit diagram showing a circuit structure of a lighting device according to an embodiment.

First, overall configurations of a lighting device and a lighting fixture according to an embodiment are described, with reference to FIG. 1.

FIG. 1 is a circuit diagram showing a circuit structure of lighting device 1 according to the present embodiment. The figure also shows AC power source 4 which generates an alternating-current (AC) voltage, and AC-to-DC converter 5 which converts the AC voltage input from AC power source 4 into a direct-current (DC) voltage.

As shown in FIG. 1, lighting fixture 3 includes lighting device 1 and load 2.

Load 2 is a solid-state light emitting element to which DC current is input from lighting device 1. Load 2 is configured of, for example, an LED, organic electro-luminescence (EL), or the like.

AC power source 4 supplies power to AC-to-DC converter 5. For example, AC power source 4 is a grid power source such as a commercial AC power source.

AC-to-DC converter 5 is a circuit which converts AC voltage into DC voltage. AC-to-DC converter 5 includes a rectifier circuit such as a diode bridge, a smoothing condenser, and a boost converter.

Lighting device 1 outputs DC current to load 2. As shown in FIG. 1, lighting device 1 includes downconverter circuit 10 and controller 20.

Downconverter circuit 10 includes switching element 15 and steps down the DC voltage input from AC-to-DC converter 5. In addition to switching element 15, downconverter circuit 10 includes diode 11, noise filter 12, resistors 13, 16, 19, electrolytic capacitor 14, capacitor 17, and inductor 18.

Diode 11, load 2, and inductor 18 form a closed circuit. Diode 11 is a rectifying element which regenerates energy stored in inductor 18. Diode 11 has the cathode terminal connected to node N1, and the anode terminal connected to node N2 via noise filter 12. Here, node N1 is connected to a high-side output terminal of AC-to-DC converter 5. Node N2 is connected to inductor 18 and the drain terminal of switching element 15.

Noise filter 12 is an element for reducing a noise component in current through downconverter circuit 10. In the present embodiment, noise filter 12 is configured of a Ferrite head, for example.

Resistor 13 is a resistance element for discharging electrolytic capacitor 14. In the present embodiment, resistor 13 is configured of three resistance elements connected in series. Resistor 13 is connected between node N1 and node N4, that is, connected in parallel with electrolytic capacitor 14. Here, node N4 is connected to inductor 18 and a negative terminal of electrolytic capacitor 14.

Electrolytic capacitor 14 is an element for smoothing a pulsation of output voltage of downconverter circuit 10. Electrolytic capacitor 14 is connected between two output terminals of downconverter circuit 10.

Switching element 15 switches (between on and off) under control by controller 20. In the present embodiment, switching element 15 is an N-channel MOSFET (Metal-Oxide Semiconductor Field-Effect Transistor) which is connected to inductor 18 in series. Switching element 15 has the drain terminal connected to node N2, and the source terminal connected to node N3. Here, node N3 is connected to one terminal of capacitor 17 and one terminal of resistor 19. Switching element 15 has the gate terminal connected to a GD terminal of controller 20.

Capacitor 17 and resistor 16 form a snubber circuit. Capacitor 17 has one terminal connected to one terminal of resistor 16, and the other terminal connected to node N3. Resistor 16 has the other terminal connected to node N2.

Inductor 18 is a choke coil. Inductor 18 has primary winding 18a and secondary winding 18b. Primary winding 18a stores and discharges energy according to switching of switching element 15. Secondary winding 18b is for detecting a state in which current through primary winding 18a is zero (zero current). Inductor 18 has primary winding 18a connected between node N4 and node N2. Secondary winding 18b has one terminal connected to node N5, and the other terminal connected to a ZCD terminal of controller 20. Here, node N5 is connected to a low-side output terminal of AC-to-DC converter 5. In the present embodiment, node N5 is grounded.

Resistor 19 is a sense resistor for detecting current through switching element 15. The current through switching element 15 corresponds to current through load 2. Resistor 19 is connected to switching element 15 in series. In the present embodiment, resistor 19 is connected between node N3 and node N5.

Controller 20 is a circuit controls turning on and off of switching element 15. Controller 20 has operating modes: a startup mode; a detection mode; and a normal mode.

In the startup mode, controller 20 turns switching element 15 on and off, based on a predetermined control setting value. The startup mode is a period of operation from a start of supply of power to lighting device 1 until electrolytic capacitor 14 is charged to a load voltage (i.e., ignition voltage) according to load 2.

In the detection mode, controller 20 detects time Ton which is a time it takes current through switching element 15 to reach a predetermined value after controller 20 turns switching element 15 on. Furthermore, in the detection mode, controller 20 determines a peak current, based on time Ton. The peak current is a control setting value corresponding to load 2.

In the normal mode, controller 20 controls switching element 15, using the control setting value determined based on time Ton detected in the detection mode, the control setting value being a parameter which is determined according to voltage of load 2 and used by controller 20. It should be noted that the control setting value determined in the detection mode may not be used as is. For example, an appropriate setting value may be determined according to each mode, based on the control setting value determined in the detection mode. Specifically, in order to carry out proper control on switching element 15 in the normal mode immediately after the detection mode, the control setting value determined in the previous detection mode is used as is. On the other hand, if an object is to cause the time it takes the solid-state light emitting element to turn on after the start of supply of power to lighting device 1 to be the same, the control setting value determined in the previous detection mode is used as is in the startup mode. In this case, the control setting value determined in the detection mode may not be used as is in the normal mode. An appropriate setting value may be determined accordingly based on the control setting value determined in the detection mode. Alternatively, in each of the startup mode and normal mode, an appropriate setting value may be determined accordingly based on the control setting value determined in the detection mode or based on time Ton detected in the detection mode.

In the present embodiment, the peak current which is the control setting value is determined such that the time it takes the solid-state light emitting element used as load 2 to turn on (i.e., a time it takes electrolytic capacitor 14 to be charged to a load voltage) is kept substantially constant, independent of load voltage.

Controller 20 is implemented by, for example, a microcomputer storing a program. The microcomputer executes the program stored therein so as to carry out the functions described herein. Controller 20 has the ZCD terminal, IS terminal, and GD terminal.

The ZCD terminal is for detecting the state in which current through inductor 18 is zero. A voltage corresponding to the current through inductor 18 is input from secondary winding 18b to the ZCD terminal. Controller 20 detects the voltage input to the ZCD terminal, thereby detecting the state in which current through inductor 18 is zero.

The IS terminal is for detecting a current through switching element 15. A voltage applied to resistor 19 is input to the IS terminal.

The GD terminal outputs to the gate terminal of switching element 15 a signal which drives switching element 15.

Figure 2:
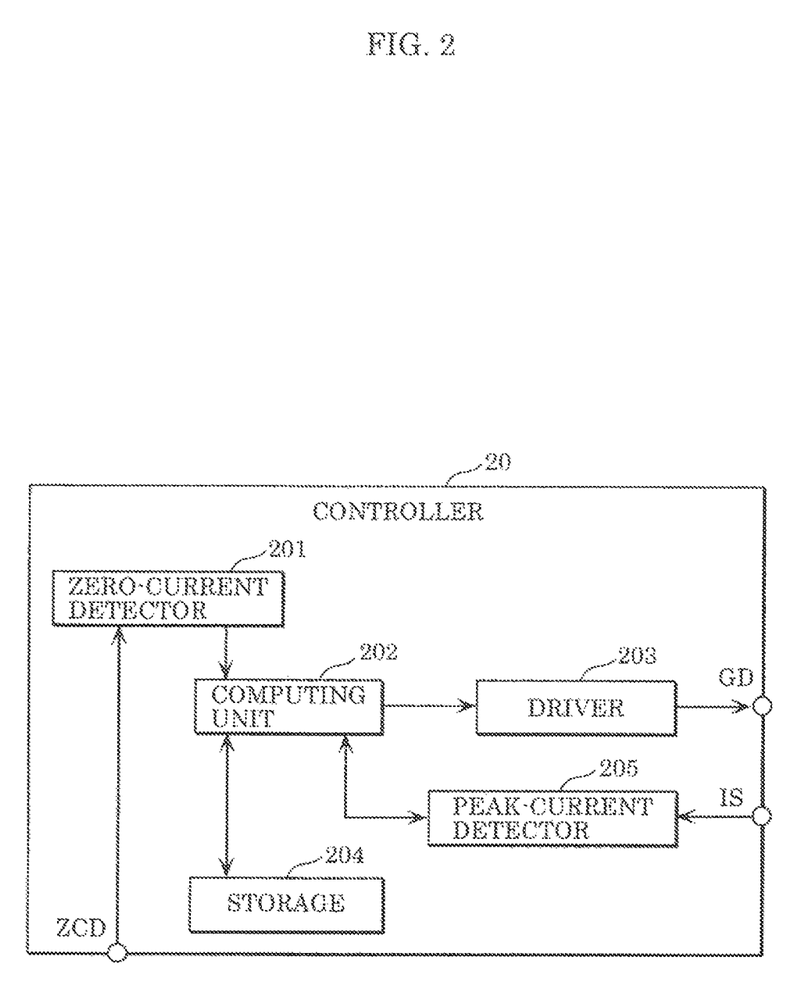
FIG. 2 is a block diagram showing a functional configuration of a controller according to the embodiment.

Next, controller 20 is to be described in detail, with reference to FIG. 2.

FIG. 2 is a block diagram showing an example of the functional configuration of controller 20 according to the present embodiment.

As shown in FIG. 2, controller 20, functionally, includes zero-current detector 201, computing unit 202, driver 203, storage 204, and peak-current detector 205.

Zero-current detector 201 is a processing unit which detects the state in which current through inductor 18 is zero, by detecting that the voltage input from the ZCD terminal is brought to zero.

Driver 203 is a processing unit which outputs to the GD terminal, based on a signal input from computing unit 202, a signal which turns switching element 15 on or off.

Storage 204 is a memory storing a relationship between time Ton detected in the detection mode and a control setting value for controlling turning on and off of switching element 15. Storage 204 also stores the control setting value used in the normal mode if supply of the power to lighting device 1 is interrupted. The control setting value used in the normal mode and stored in storage 204 is referred to by computing unit 202 upon resumption of supply of the power to lighting device 1.

Peak-current detector 205 is a processing unit which detects the current through switching element 15 by detecting a voltage input from the IS terminal. A signal indicative of a value of the peak current is input from computing unit 202 to peak-current detector 205. As a voltage corresponding to the signal is input to the IS terminal, peak-current detector 205 outputs to computing unit 202 a signal which indicates that the peak current is detected.

Computing unit 202 is a processing unit which performs computations for the control performed by controller 20. Specifically, computing unit 202 switches the operating mode of controller 20 to the normal mode, the detection mode or the startup mode. The individual operating modes are to be described below. Computing unit 202 also controls turning on and off of switching element 15 by inputting a signal to driver 203 in each operating mode.

More specifically, computing unit 202, first, outputs to driver 203 a signal for turning switching element 15 on. Next, when detected, based on the signal from peak-current detector 205, that the current through switching element 15 has reached a predetermined peak current, computing unit 202 outputs to driver 203 a signal for turning switching element 15 off. Next, when detected, based on the signal from zero-current detector 201, that the current through inductor 18 is zero, computing unit 202 outputs to driver 203 a signal for turning switching element 15 back on.

[2. Operation]

Next, the operation of lighting device 1 according to the present embodiment is described.

[2-1. Detection Mode]

Figure 3:
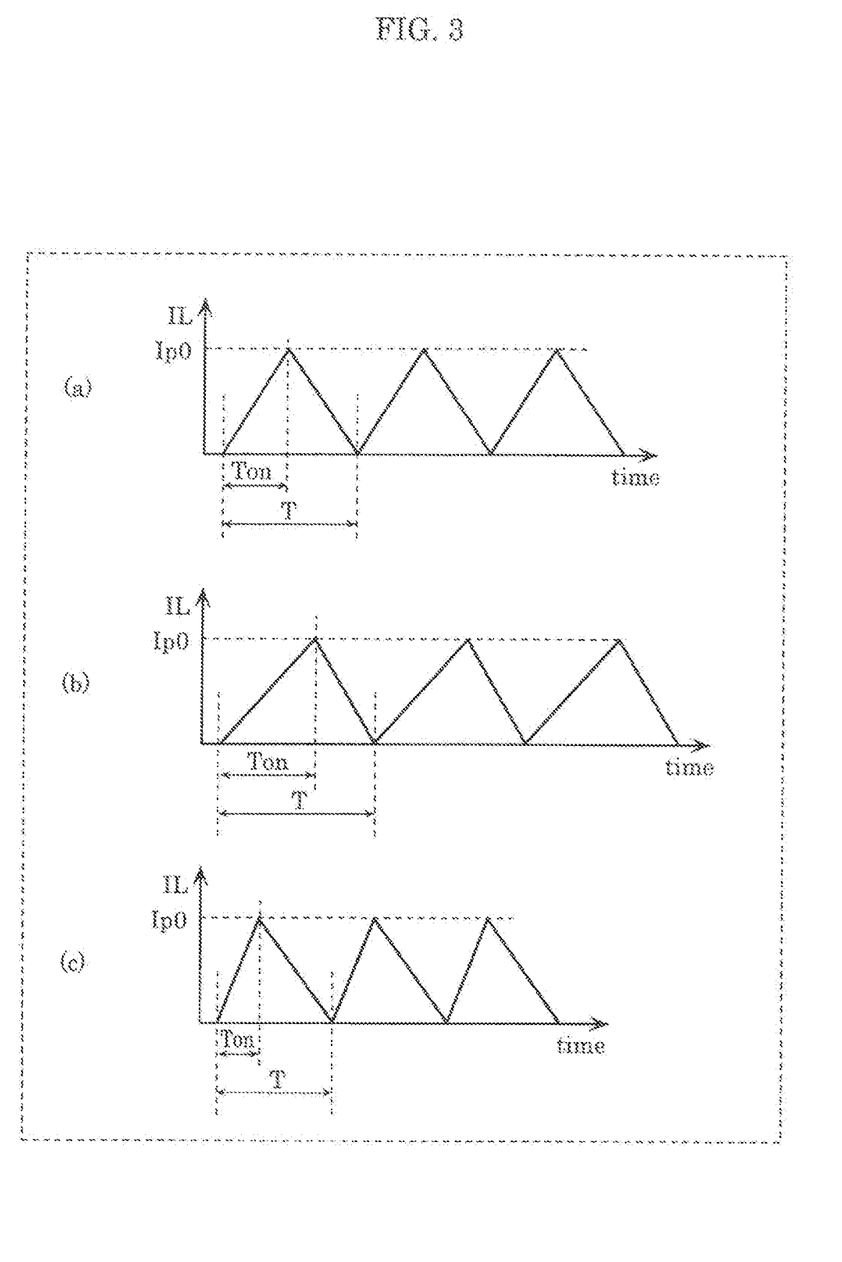
FIG. 3 is a graph illustrating waveforms of inductor current IL when the lighting device according to the embodiment is in a detection mode.

First, the detection mode, one of the operating modes of controller 20, is described, with reference to FIG. 3.

FIG. 3 is a graph illustrating waveforms of inductor current IL when lighting device 1 according to the present embodiment is in the detection mode. Inductor current IL as used herein refers to current through primary winding 18a included in inductor 18 shown in FIG. As shown in FIG. 1, inductor 18 is connected in series to load 2 to which electrolytic capacitor 14 is connected in parallel. Thus, the current through inductor 18 corresponds to the current obtained by electrolytic capacitor 14 smoothing inductor current IL. Graph (a) of FIG. 3 illustrates a waveform of inductor current IL when a load voltage (i.e., forward voltage Vf), which is a voltage applied to load 2, is medium. Graph (b) of FIG. 3 illustrates a waveform of inductor current IL when the load voltage is greater than the case as illustrated in graph (a). Graph (c) illustrates a waveform of inductor current IL when the load voltage is less than the case as illustrated in graph (a).

In the detection mode, computing unit 202 included, in controller 20 detects time Ton, it takes inductor current IL to reach predetermined current Ip0. As illustrated in the graphs of FIG. 3, the slope of inductor current IL when switching element 15 is in the on-state changes according to a load voltage. The greater the load voltage is the smaller the slope of inductor current IL is. Thus, the load voltage can be detected based on time Ton it takes the current through switching element 15 to reach a predetermined value (here, current Ip0) after controller 20 turns switching element 15 on. Here preferably, current Ip0, which is the predetermined current value, is, but not particularly limited to, has a small value. Setting current Ip0 to a small value allows reduction of power consumption in the detection mode. For example, current Ip0 may be set to a value of the peak current through switching element 15 when lighting device 1 is at a lowest dimming level. The lowest dimming level as used herein refers to a dimming level when output current of lighting device 1 is smallest.

While the example waveforms illustrated in FIG. 3 show examples where switching element 15 is turned, off when the current through switching element 15 has reached current Ip0, the method of control of switching element 15 in the detection mode is not limited thereto. In the detection mode, switching element 15 is not necessary be turned off insofar as time Ton can be detected when the current through switching element 15 has reached current Ip0. For example, switching element 15 may be turned off when the current through switching element 15 has reached a predetermined current beyond current Ip0. This allows the solid-state light emitting element used as load 2 to be turned on at a desired output even in the detection mode, by supplying the predetermined current to load 2. Time Ton is detected once or a number of times. If time Ton is detected a number of times, an average value of the detected times Ton may be defined as a value representative of the times Ton. It should be noted that switching cycle T (see FIG. 3) of switching element 15 may be detected in the detection mode.

Next, computing unit 202 included in controller 20 determines a control setting value, based on the detected time Ton, the control setting value being the control parameter used to control turning on and off of switching element 15. In the present embodiment, the peak current through switching element 15 is used as the control setting value. In the present embodiment, the peak current which is the control setting value is determined such that the time it takes the solid-state light emitting element used as load 2 to turn on after supply of the power to lighting device 1 starts is kept substantially constant, independent of load voltage.

Computing unit 202 included in controller 20 refers to storage 204, thereby determining the peak current which is the control setting value based on time Ton detected in the detection mode. Storage 204 stores relationship between time Ton detected in the detection mode and the peak current which is the control setting value. Here, the relationship between time Ton and peak current is to be described, with reference to FIG. 4.

Figure 4:
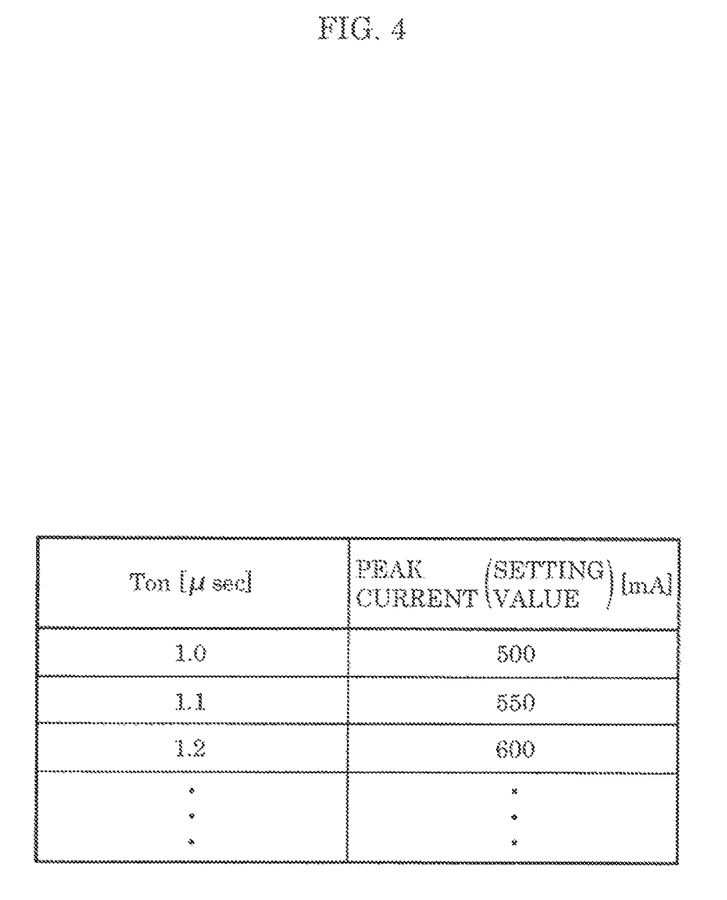
FIG. 4 is an example of a table illustrating a relationship between time Ton and a peak current, stored in a storage according to the embodiment.

FIG. 4 is an example of a table stored in storage 204 according to the present embodiment. The table indicates the relationship between time Ton and peak current. As shown in FIG. 4, the longer the time Ton is, the greater the control setting value is set to in the present embodiment. This can reduce differences, which are caused by load voltage, in time it takes the solid-state light emitting element used as load 2 to turn on.

As shown in FIG. 4, storage 204 is storing the relationship between time Ton and peak current which is the control setting value and corresponding to time Ton. From the relationship stored in storage 204, computing unit 202 can determine a peak current that is corresponding to time Ton detected in the detection mode. If time Ton detected in the detection mode is not listed in the table as illustrated in FIG. 4, computing unit 202 may determine a peak current from the relationship between time Ton and peak current shown in the table, using a method such as interpolation.

While FIG. 4 illustrates an example of the table showing the relationship between time Ton and peak current, it should be noted that the relationship between time Ton and peak current in storage 204 may be stored therein in a form other than a table. For example, storage 204 may store mathematical relation between time Ton and peak current.

Computing unit 202 determines whether it is necessary to change the control setting value which has been used prior to a detection mode operation. In other words, computing unit 202 determines whether the peak current which is the control setting value and determined in the detection mode is different from a peak current having been used prior to the detection mode operation. Storage 204 is storing the peak current used prior to the detection mode operation. Computing unit 202 compares and determines whether the peak current stored in storage 204 and the peak current determined in the detection mode are different. It should be noted that if a difference between both the peak currents as a result of the comparison falls within a predetermined range, these peak currents may be regarded as being substantially the same. The determination as to whether the control setting value need to be changed may be made by a method other than the control setting value comparison. For example, time Ton detected in the detection mode may be stored in storage 204, and computing unit 202 may make the determination by comparing time Ton detected in the current detection mode with time Ton detected in the previous detection mode.

If the peak current determined in the detection mode is determined to be different from the peak current used prior to the detection mode operation, computing unit 202 updates the control setting value used prior to the detection mode operation and stored in store 204 to the peak current determined in the detection mode.

As described above, in the detection mode, time Ton corresponding to the load voltage is detected and the peak current which is the control setting value corresponding to load 2 is determined based on time Ton. The control setting value determined in the detection mode is used to properly control the normal mode and the next startup mode.

While the timing that controller 20 operates in the detection mode is not particularly limited, it should be noted that controller 20 may detect time Ton in the detection mode, for example, during a period of time immediately after load 2 turns on.

[2-2. Normal Mode]

Next, the normal mode, one of the operating modes of controller 20, is described.

In the normal mode, controller 20 controls switching element 15, using the peak current which is the control setting value and determined in the detection mode. More specifically, first, in the normal mode, computing unit 202 included in controller 20 causes driver 203 to turn switching element 15 on. Next, computing unit 202 causes driver 203 to turn switching element 15 off if peak-current detector 205 detects that the current through switching element 15 has reached the peak current determined in the detection mode. Then, computing unit 202 causes driver 203 to turn switching element 15 back on when zero-current detector 201 detects that inductor current IL through inductor 18 has been brought to zero. Controller 20 thereafter repeats the same control.

Since controller 20 uses the control setting value determined in the detection mode to control switching element 15 in such a manner as described above, current that is suited for the load voltage can be supplied to load 2.

[2-3. Operational Flow]

Figure 5:
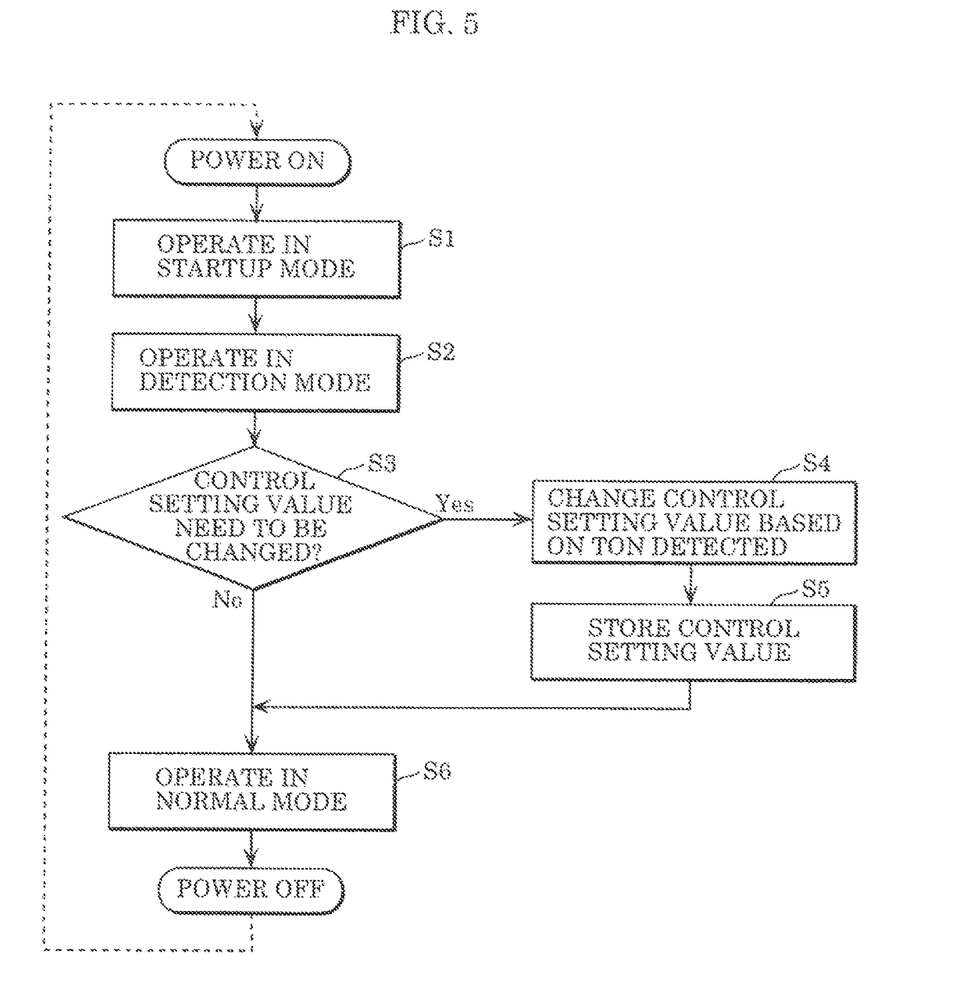
FIG. 5 is a flowchart illustrating operation of the lighting device according to the embodiment.

Next, operational flow of lighting device 1 according to the present embodiment is described, with reference to FIG. 5.

FIG. 5 is a flowchart illustrating the operation of lighting device 1 according to the present embodiment.

As illustrated in FIG. 5, first, lighting device 1 is powered on. In other words, supply of power to lighting device 1 starts. It should be noted that the supply of power to lighting device 1 may be controlled by controlling output of AC power source 4. Alternatively, devices such as a power switch and a dimmer may be provided between AC power source 4 and lighting device 1 and these devices may control the supply of power to lighting device 1.

Next, controller 20 operates in the startup mode (S1). In other words, controller 20 turns switching element 15 on and off, based on the predetermined control setting value or based on the control setting value used in the previous normal mode.

Next, controller 20 operates in the detection mode (S2). In other words, controller 20 detects time Ton it takes the current through switching element 15 to reach the predetermined value (current Ip0) after switching element 15 turns on. Controller 20 determines the peak current which is the control setting value, based on time Ton detected in the detection mode.

Next, controller 20 determines whether the peak current, which is the control setting value and used prior to the detection mode operation, needs to be changed (S3). In the present embodiment, controller 20 determines whether the peak current needs to be changed by comparing the peak current determined based on time Ton detected in the detection mode and the peak current used prior to the detection mode operation.

Here, if determined that the peak current which is the control setting value and has been used prior to the detection mode operation need not be changed (No in S3), controller 20 directly transitions to the normal mode operation (S6).

On the other hand, if determined that the peak current which is the control setting value and has been used prior to the detection mode operation needs to be changed (Yes in S3), controller 20 changes the peak current which is the control setting value, based on time Ton detected in the detection mode (S4). In other words, controller 20 changes the peak current to be used in the normal mode from the peak current used prior to the detection mode operation to the peak current determined based on time Ton detected in the detection mode. Controller 20 stores the peak current which is the control setting value to which the change has been made (S5). In the present embodiment, the peak current having been changed is stored into storage 204 included in controller 20. Controller 20 stores the peak current; which is the control setting value into storage 204, and then transitions to the normal mode operation (S6).

Controller 20 continues the normal mode operation until lighting device 1 is powered off. In other words, controller 20 continues the normal mode operation until supply of the power to lighting device 1 is interrupted.

Controller 20 repeats the above-described operations after lighting device 1 is powered off.

As described above, the operation of controller 20 allows, for example, even if the solid-state light emitting element used as load 2 is changed to another solid-state light emitting element, lighting device 1 to sense changes in load, voltage by detecting time Ton corresponding to the load voltage in the detection mode. Furthermore, as a load voltage changes, lighting device 1 determines a control setting value corresponding to the load voltage, thereby supplying a suited current to load 2.

It should be noted that the timing that controller 20 controls switching element 15 in the detection mode is, but not particularly limited to, immediately after lighting device 1 leaves the startup mode, as illustrated in the flowchart of FIG. 5. An overview of a waveform of inductor current IL in this case is to be described with reference to FIG. 6.

Figure 6:
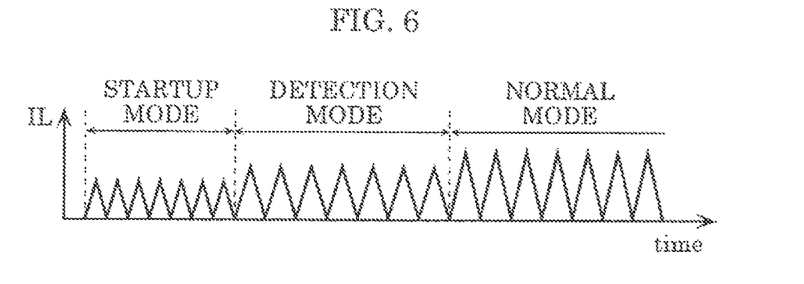
FIG. 6 is a graph illustrating an overview of a waveform of inductor current IL of the lighting device according to the embodiment.

FIG. 6 is a graph illustrating the overview of the waveform of inductor current IL in lighting device 1 according to the present embodiment.

As illustrated in FIG. 6, lighting device 1, upon power on, first charges electrolytic capacitor 14 in the startup mode. Lighting device 1 next operates in the detection mode. In the present embodiment, a peak value of inductor current IL, that is, the peak current are controlled in the detection mode so as to be less than or equal to those in the normal mode.

Next, lighting device 1 performs the normal mode operation, using the peak current which is the control setting value and determined in the detection mode. Lighting device 1 continues the normal operation until powered off.

Even if a solid-state light emitting element connected as load 2 to lighting device 1 is changed to another solid-state light emitting element that has a different forward voltage, use of the control setting value determined in the detection mode in the manner as described above can keep substantially constant the time it takes the solid-state light emitting element to turn on after start of supply of power to lighting device 1. Effects of doing so are to be described with reference to FIG. 7.

Figure 7:
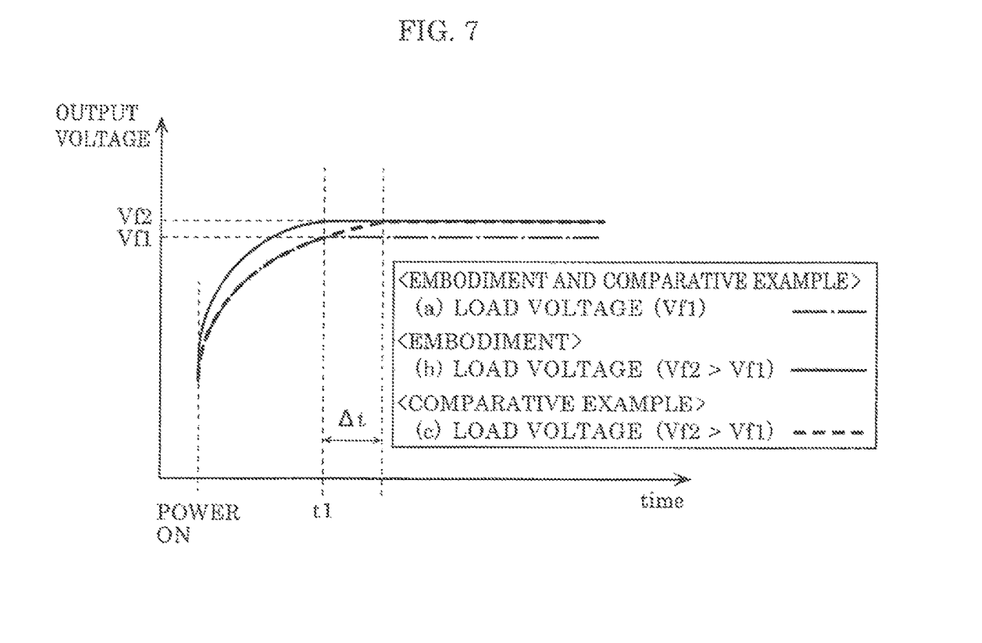
FIG. 7 is a graph illustrating waveforms of output voltages of the lighting device according to the embodiment.

FIG. 7 is a graph illustrating waveforms of the output voltages of lighting device 1 according to the present embodiment.

In FIG. 7, Vf1 represents the load voltage (forward voltage) of load 2 connected to lighting device 1 according to the present embodiment; and the dot-dash line depicts an example waveform (a) of an output voltage of lighting device 1 according to the present embodiment when the peak current which is the control setting value is Ip10. The solid line depicts an example waveform (b) of an output voltage of lighting device 1 according to the present embodiment when the load voltage of load 2 connected to lighting device 1 according to the present embodiment is Vf2 higher than Vf1 and the peak current which is the control setting value is Ip20. It should be noted that the peak current, Ip20 which is the control setting value and used when the load voltage is Vf2 is different from peak current Ip10 that is used when the load voltage is Vf1 because lighting device 1 according to the present embodiment uses the control setting value according to the load voltage.

FIG. 7 further illustrates a waveform of an output voltage of a lighting device of Comparative Example. The lighting device of Comparative Example has the same configuration as lighting device 1, except that a controller included in the lighting device of Comparative Example does not have the detection mode. When a voltage of a load (forward voltage) connected to the lighting device of Comparative Example is Vf1 and a peak current which is a control setting value is Ip10, the waveform of the output voltage of the lighting device of Comparative Example matches the above mentioned waveform (a) of the output voltage of lighting device 1 according to the present embodiment. The dashed line depicts a waveform of the output voltage (c) of the lighting device of Comparative Example when a voltage (forward voltage) of the load connected to the lighting device of Comparative Example is Vf2 and the peak current which is the control setting value is Ip10.

As illustrated in FIG. 7, in lighting device 1 according to the present embodiment, the time from power on (start of supply of the power to lighting device 1) to time t1 at which the output voltage is saturated is substantially the same in both cases where the load voltage is Vf1 and Vf2. In other words, the time it takes the solid-state light emitting element which is load 2 to turn on is substantially the same in both cases where the load voltage is Vf1 and Vf2. On the other hand, in the lighting device of Comparative Example, the time it takes the output voltage to be saturated is longer by Δt in the case where the load voltage is Vf2 than the case where the load voltage is Vf1.

In this manner, lighting device 1 according to the present embodiment changes the control setting value according to a load voltage, thereby keeping substantially constant the time it takes the output voltages to be saturated, that is, the time it takes the solid-state light emitting element which is load 2 to turn on.

It should be noted that in a general example of lighting device 1, the time it takes lighting device 1 to transition to the detection mode is about 10 μsec to about 100 μsec, and the time it takes lighting device 1 to turn on is about one second. Thus, even if lighting device 1 is caused to operate in the detection mode immediately after the solid-state light emitting element turns on, its effect on the normal mode operation of lighting device 1 can be ignored.

[3. Effects]

As described above, lighting device 1 according to the present embodiment is a lighting device which outputs a DC current to a load, the lighting device including: downconverter circuit 10 which includes switching element 15 and steps down a DC voltage input to downconverter circuit 10; and controller 20 which controls turning on and off of switching element 15, wherein controller 20 has operating modes including a detection mode in which controller 20 detects time Ton taken for a current through switching element 15 to reach a predetermined value after switching element 15 turns on, the current through the switching element representing the DC current output to the load.

This allows lighting device 1 to detect time Ton corresponding to a load voltage. In other words, using the time Ton detected in the detection mode, lighting device 1 can sense a load voltage.

For example, in lighting device 1 according to the present embodiment, the operating modes may further include a normal mode in which controller 20 controls switching element 15 using a control setting value determined based on time Ton detected in the detection mode.

This allows controller 20 to perform different controls according to different load voltages, by controlling switching element 15 using the control setting value determined based on time Ton detected in the detection mode.

For example, in lighting device 1 according to the present embodiment, the control setting value may be a peak current through switching element 15.

This allows the time it takes the solid-state light emitting element used as load 2 to turn on to be kept substantially constant, independent of load voltage, by appropriately determining the relationship between time Ton in the detection mode and the peak current which is the control setting value.

For example, in lighting device 1 according to the present embodiment, the longer time Ton detected in the detection mode is, the greater the control setting value may be set to.

This allows reduction of differences, caused by load voltage, in time it takes the solid-state light emitting element used as load 2 to turn on.

For example, in lighting device 1 according to the present embodiment, controller 20 may include storage 204 storing a relationship between the time detected in the detection mode and the control setting value, and determine the control setting value to be used in the normal mode by referring to storage 204.

This allows controller 20 to determine the control setting value.

For example, in lighting device 1 according to the present embodiment, controller 20 may store the control setting value used in the normal mode if supply of power to lighting device 1 is interrupted, and upon resumption of supply of the power refer to the control setting value stored.

This allows controller 20 to refer to the control setting value that is used prior to interruption to supply of the power.

For example, in lighting device 1 according to the present embodiment, controller 20 may set the predetermined value to be used in the detection mode to a value of a peak current through the switching element when lighting device 1 is at a lowest dimming level.

This allows reduction of power consumption in the detection mode.

For example, in lighting device 1 according to the present embodiment, in the detection mode, controller 20 may detect; the time upon start of supply of power to lighting device 1.

If load 2 is changed to another load at the interruption of supply of the power to lighting device 1 and, consequently, the load voltage is changed, the above configuration allows such changes to be sensed without delay.

Variation

While lighting device 1 and lighting fixture 3 according to the present disclosure have been described with reference to the above embodiment, the present disclosure is not limited to the embodiment.

For example, while the control on the switching element in the normal mode starts immediately after the detection mode in the above embodiment, the control in the normal mode may not start immediately after the detection mode. A lighting device according to a variation of the above embodiment is the same as lighting device 1 according to the above embodiment, except for control aspects. Control aspects of the lighting device according to the variation are to be described, with reference to FIG. 8.

Figure 8:
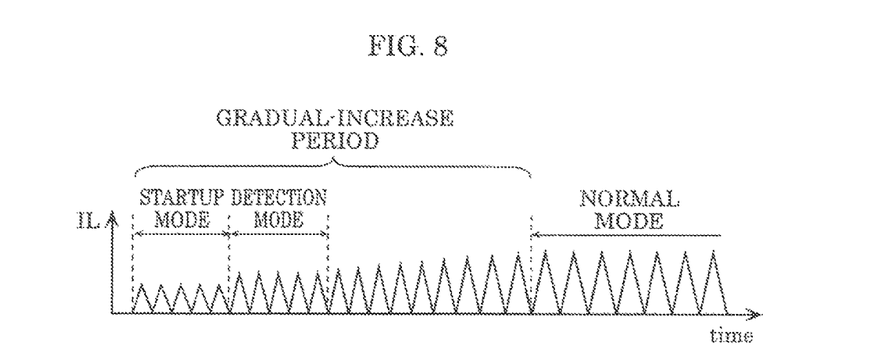
FIG. 8 is a graph illustrating an overview of a waveform of inductor current IL of a lighting device according a variation of the embodiment.

FIG. 8 is a graph illustrating an overview of a waveform of inductor current IL in the lighting device according to the variation.

As shown in FIG. 8, in the lighting device according to the variation, upon start of supply of the power to the lighting device, a controller generates a gradual-increase period in which an output current of a downconverter circuit is gradually increased. The controller may control the switching element in the detection mode during at least a portion of the gradual-increase period. This can gradually increase the current through the solid-state light emitting element, thereby preventing the current from flowing abruptly through the solid-state light emitting element. Thus, the stress on the solid-state light emitting element is alleviated, thereby suppressing deterioration of the solid-state light emitting element. This also gradually increases the intensity of the light emitted by the solid-state light emitting element, thereby helping a user feel less dazzled at a moment when the solid-state light emitting element turns on. While the control on the switching element in the detection mode is performed in the beginning of the gradual-increase period in the example waveform illustrated in FIG. 8, it should be noted that the control on the switching element in the detection mode may be performed in the middle of the gradual-increase period. Alternatively, the control on the switching element in the detection mode may be performed in the middle of the normal mode.

Alternatively, while the control on the switching element in the detection mode is performed across the plurality of switching cycles in the example as illustrated in FIG. 8, for example, it should be noted that the control on the switching element in the detection mode may be performed across one switching cycle.

While the peak current which is the control setting value is determined in the above embodiment such that the time it takes the solid-state light emitting element used as load 2 to turn on is kept substantially constant independent of load voltage, the manner of determination of the control setting value is not limited thereto. For example, even if the current to be supplied from lighting device 1 to load 2 is set to a predetermined value, the current actually supplied to load 2 varies according to a load voltage. Thus, the peak current which is the control setting value may be determined such that the current supplied to load 2 is kept substantially constant, independent of load voltage.

While the peak current is used as the control setting value in the above embodiment, another parameter may be used as the control setting value. For example, a control setting value which indicates a curve of dimming of lighting device 1 may be used as the control setting value. The curve of dimming as used herein refers to a curve indicative of relationship between the current supplied to load 2 and a dimming level of lighting device 1. This allows controlling dimming of lighting device 1 using a desired curve of dimming independent of load voltage, by using different curves of dimming for different load voltages.

While AC-to-DC converter 5 is used as the source of the DC voltage supplied to lighting device 1 in the above embodiment, any other DC power source may be used.

In other instances, various modifications to the exemplary embodiment according to the present disclosure described above that may be conceived by a person skilled in the art and embodiments implemented by any combination of the components and functions shown in the exemplary embodiment are also included within the scope of the present disclosure, without departing from the spirit of the present disclosure.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting device which outputs a DC current to a load, the lighting device comprising:
   a downconverter circuit which includes a switching element and steps down a DC voltage input to the downconverter circuit; and
   a controller which controls turning on and off of the switching element, wherein
   the controller has operating modes including a detection mode in which the controller detects a time taken for a current through the switching element to reach a predetermined value after the switching element turns on, the current through the switching element representing the DC current output to the load,
   the operating modes further include a normal mode in which the controller controls the switching element using a control setting value determined based on the time detected in the detection mode,
   the control setting value is a peak current through the switching element, and
   the longer the time detected in the detection mode is, the greater the control setting value is set to.

2. The lighting device according to claim 1, wherein the controller sets the predetermined value to be used in the detection mode to a value of a peak current through the switching element when the lighting device is at a lowest dimming level.

3. The lighting device according to claim 1, wherein in the detection mode, the controller detects the time upon start of supply of power to the lighting device.

4. The lighting device according to claim 1, wherein the controller
   generates, upon start of supply of power to the lighting device, a gradual-increase period in which an output current of the downconverter circuit is gradually increased, and
   in the detection mode, detects the time during at least a portion of the gradual-increase period.

5. A lighting fixture comprising:
   the lighting device according to claim 1; and
   a solid-state light emitting element as the load.

6. A lighting device which outputs a DC current to a load, the lighting device comprising:
   a downconverter circuit which includes a switching element and steps down a DC voltage input to the downconverter circuit; and
   a controller which controls turning on and off of the switching element, wherein
   the controller has operating modes including a detection mode in which the controller detects a time taken for a current through the switching element to reach a predetermined value after the switching element turns on, the current through the switching element representing the DC current output to the load,
   the operating modes further include a normal mode in which the controller controls the switching element using a control setting value determined based on the time detected in the detection mode, and
   the controller includes a storage storing a relationship between the time detected in the detection mode and the control setting value, and determines the control setting value to be used in the normal mode by referring to the storage.

7. A lighting device which outputs a DC current to a load, the lighting device comprising:
   a downconverter circuit which includes a switching element and steps down a DC voltage input to the downconverter circuit; and
   a controller which controls turning on and off of the switching element, wherein
   the controller has operating modes including a detection mode in which the controller detects a time taken for a current through the switching element to reach a predetermined value after the switching element turns on, the current through the switching element representing the DC current output to the load,
   the operating modes further include a normal mode in which the controller controls the switching element using a control setting value determined based on the time detected in the detection mode, and
   the controller stores the control setting value used in the normal mode if supply of power to the lighting device is interrupted, and upon resumption of supply of the power refers to the control setting value stored.

* * * * *